(12) United States Patent
Shreve et al.

(10) Patent No.: US 9,563,914 B2
(45) Date of Patent: Feb. 7, 2017

(54) USING HEAD MOUNTABLE DISPLAYS TO PROVIDE REAL-TIME ASSISTANCE TO EMPLOYEES IN A RETAIL ENVIRONMENT

(71) Applicant: Xerox Corporation, Norwalk, CT (US)

(72) Inventors: Matthew A. Shreve, Tampa, FL (US); Michael C. Mongeon, Walworth, NY (US); Robert P. Loce, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 493 days.

(21) Appl. No.: 14/253,074

(22) Filed: Apr. 15, 2014

(65) Prior Publication Data

US 2015/0294394 A1 Oct. 15, 2015

(51) Int. Cl.
| | |
|---|---|
| *G06Q 30/00* | (2012.01) |
| *G06Q 30/06* | (2012.01) |
| *G06Q 10/08* | (2012.01) |
| *G06Q 20/18* | (2012.01) |
| *G06K 9/00* | (2006.01) |
| *G02B 27/01* | (2006.01) |

(52) U.S. Cl.
CPC ......... *G06Q 30/0635* (2013.01); *G02B 27/017* (2013.01); *G06K 9/00671* (2013.01); *G06Q 10/083* (2013.01); *G06Q 20/18* (2013.01); *G02B 2027/014* (2013.01); *G02B 2027/0138* (2013.01); *G02B 2027/0141* (2013.01); *G02B 2027/0178* (2013.01)

(58) Field of Classification Search
CPC .............. G02B 27/017; G02B 27/0138; G02B 27/0141; G02B 27/014; G02B 27/0178; G06Q 30/06; G06Q 30/0635; G06Q 20/18
See application file for complete search history.

(56) References Cited

U.S. PATENT DOCUMENTS

| | | | |
|---|---|---|---|
| 9,069,382 B1 * | 6/2015 | Starner | G06F 3/038 |
| 2013/0069985 A1 * | 3/2013 | Wong | G02B 27/017 |
| | | | 345/633 |
| 2014/0064566 A1 | 3/2014 | Shreve et al. | |
| 2014/0379346 A1 * | 12/2014 | Aleksic | G10L 15/25 |
| | | | 704/251 |

* cited by examiner

*Primary Examiner* — Yogesh C Garg
(74) *Attorney, Agent, or Firm* — Fay Sharpe LLP (57) ABSTRACT

A system for delivering one of a good and service to a customer in a retail environment includes a computer located at an order station. The computer is configured to receive an order for the one good and service. The system includes a first image capture device in communication with the computer. The first image capture device captures a first image of a customer ordering the one good and service in response to the order being submitted. The system further includes a wearable computer peripheral device configured to acquire the first image from the first image capture device and electronically display the first image to a user tasked with delivering the one good and service while carrying the second wearable computer peripheral device. In this manner, an identity of the customer can be compared against the first image upon a delivery of the one good and service.

23 Claims, 6 Drawing Sheets

USING HEAD MOUNTABLE DISPLAYS TO PROVIDE REAL-TIME ASSISTANCE TO EMPLOYEES IN A RETAIL ENVIRONMENT

BACKGROUND

The present disclosure relates to a method and system for delivering goods and services using a wearable computer peripheral device in communication with an order station. The disclosure finds application in restaurant and retail environments. However, it is appreciated that the present exemplary embodiments are also amenable to other like applications in commerce.

Certain business environments, such as fast food or drive-in restaurants and markets with counter service, are set up to provide goods and/or services (hereinafter "goods/services") quickly. Generally, these businesses employ a person at an order station located at the counter or window. Other businesses use kiosks to receive the orders by enabling a customer to input selections on an interactive interface. As a consequence of both these business models, the persons preparing and/or delivering the goods/services can lose track of customers and/or mix up the orders during busy periods. Certain businesses attempt to avoid this problem by providing the customer with a ticket and/or order number, which can be announced over an intercom when the order is ready. This approach usually entails these businesses to check the ticket to verify that the good/service was paid for by the customer before it relinquishes the item(s). The process of printing and checking tickets leads to an unnecessary waste of employee time and resources. Other businesses perform a different perfunctory form of managing the delivery of orders, such as writing the customer's name and/or instructions on the item to avoid mixing up orders. When the order is completed, it can be announced to the customer in the same manner described above or it can be set on the counter for the customer to identify and grab at-will. One problem with this approach, inter alia, is that a crowd of customers tend to linger within earshot of the counter where the good/service can be picked up. Certain restaurant and business environments avoid this occurrence by providing waiting regions and/or minimal (e.g., table) service at a location removed from the counter while providing its customers with pager devices. The customers are notified that the good/service is ready when the pager vibrates. One undesired consequence of using pagers is that germs can be passed between multiple employees and customers.

Figure 1:
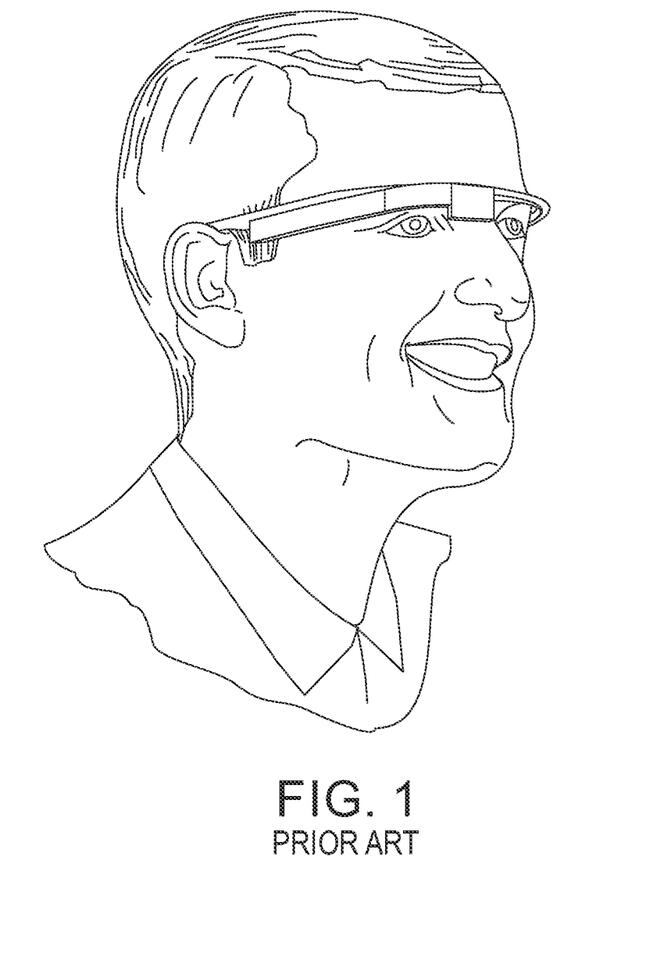
FIG. 1 shows a wearable computer peripheral in the PRIOR ART.

An alternative, passive method and system is desired for the delivery of goods/services, and more particularly, one that avoids the hassles of printing tickets, writing on items, announcing pick-ups, spreading of germs, and crowding at pick-up stations, etc. The present disclosure contemplates using head mountable computers for the delivery of the goods/services. One known prototype of a head mountable computer is Google Glass®, a wearable computer peripheral worn on the head for mobile devices that remotely access and transmit data. FIG. 1 shows the wearable computer in the PRIOR ART mounted on regular spectacle frames, where it displays video and data, such as navigational directions in the form of semi-transparent overlays and communications through e-mail and Skype® services, etc. The Google Glass® shown in FIG. 1 operates by providing the user with a monitor in an upper right portion of his/her visual field. The wearable computer can also include an accelerometer—to track subtle head movements and orientation—and a camera to capture images and videos. A software development kit enables the wearable computer to develop a number of different computer applications.

A method and system is desired for configuring a wearable computer peripheral device for enabling a delivery of goods/services in certain business environments.

INCORPORATION BY REFERENCE

The disclosure of co-pending and commonly assigned U.S. patent application Ser. No. 13/964,652 (now Published application No. US-2014-0064566-A1), entitled "Heuristic-Based Approach for Automatic Payment Gesture Recognition", filed Aug. 12, 2013, by Matthew Shreve, et al., is totally incorporated herein by reference.

BRIEF DESCRIPTION

One embodiment of the disclosure relates to a system for delivering one of a good and service to a customer in a retail environment. The system includes a computer located at an order station. The computer is configured to receive an order for the one good and service. The system includes a first image capture device in communication with the computer. The first image capture device captures a first image of a customer ordering the one good and service in response to the order being submitted. The system further includes a wearable computer peripheral device configured to retrieve the first image from the first image capture device and electronically display the first image to a user tasked with delivering the one good and service while carrying the second wearable computer peripheral device. In this manner, the identity of the customer can be compared against the first image upon a delivery of the one good and service.

Another embodiment of the disclosure relates to a method for delivering one of a good and service to a customer in a retail environment. The method includes receiving an order for the one good and service at a computer located at an order station. In response to the order for the one good and service being submitted, the method includes capturing a first image of a customer submitting the order using a first image capture device in communication with the computer. Using a wearable computer peripheral device, the method includes electronically providing an employee of the retail environment the first image of the customer for comparing the identity of the customer against the first image upon a delivery of the one good and service.

DETAILED DESCRIPTION

The disclosure contemplates a use of the present embodiments in a conventional business and/or sales environment of the type where a purchase of a good/service involves the placement of an order by a customer at an order station, a period in which the order is prepared by the business, and a delivery of the completed order to the customer either by calling the customer to a pick-up station or taking the good/service to the customer. An "order station", as used herein, can include a walk-up or drive-through counter tendered by an employee/cashier, a kiosk operated by the customer, and the like.

The present disclosure relates to a method and system that facilitates a passive delivery of the good/service to the customer where an employee of the business takes the good/service to the customer removed from the order station location. Mainly, the system provides the delivery employee (hereinafter "user") with customer identification information using a wearable computer peripheral device worn by the user. The wearable computer peripheral device can provide this customer identification information to the user on a head mounted display. The information can be displayed as an automatically or manually generated image/video of the customer, features of the customer (appearance), an order ID, a real-time location of the customer in the business region, and a combination of the above. The generation of this information is performed in response to the order being placed, and can be achieved in-part by tracking a trajectory of the customer through the region using an external sensor network. In this manner, the user can easily locate the customer for delivering the good/service. The system further enables the user to confirm the identity of the user.

Figure 2:
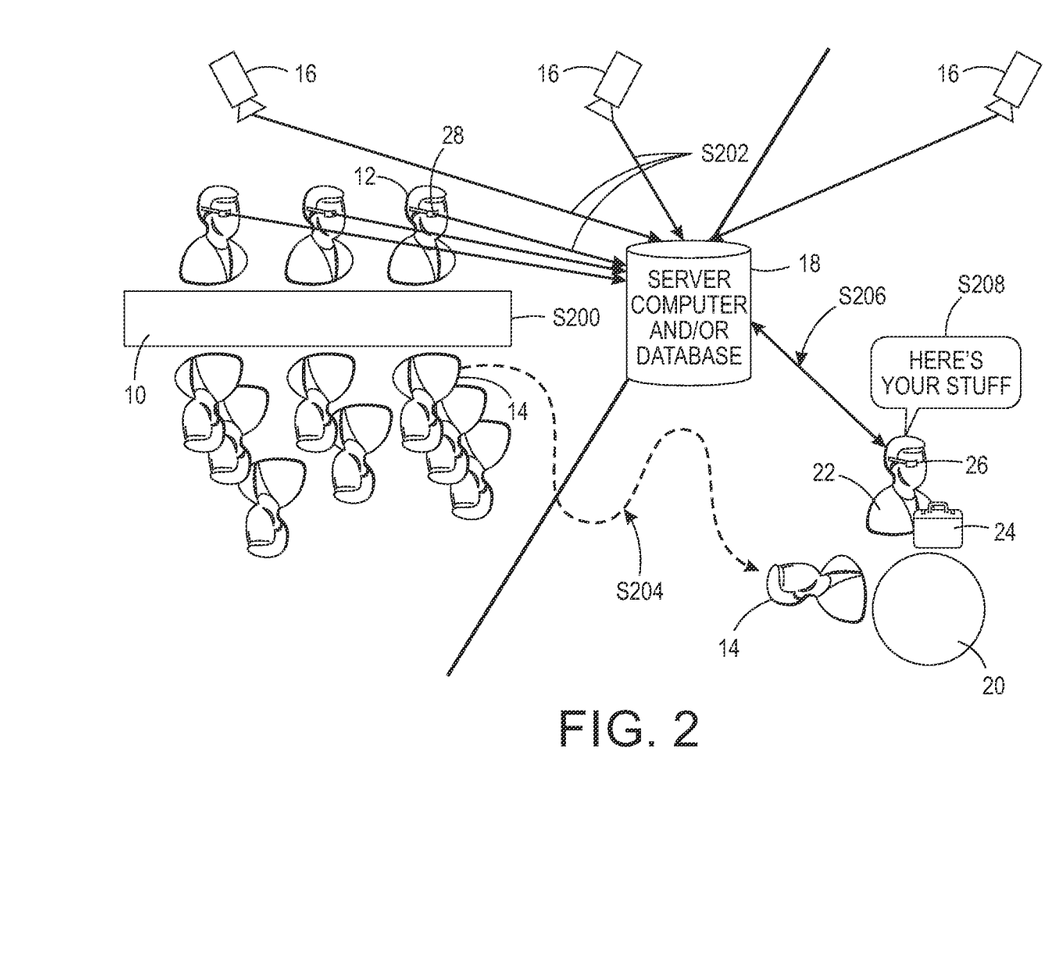
FIG. 2 is an overview of a system for delivering goods/services to a customer located at a position removed from the order station.

FIG. 2 is an overview of a method for delivering goods/services to a customer located at a position removed from the order station. Firstly, the business environment is described as including an order station 10, represented as a sales counter, tendered by a first employee/cashier 12, which assists in taking the order of a customer 14. At least one image capture device 16 is mounted in the region for capturing image and video data, and transmitting the data to a central database 18. In the contemplated embodiment, a network of image capture devices 16 can be used for surveying a scene of interest and tracking the customer 14 through the region. The system anticipates that after placing the order, the customer 14 relocates itself to another location in the region to wait for the order to be fulfilled. In the illustration, this location includes a table 20 removed from the order station 10. A second employee/user 22, different from the first employee 12 in FIG. 2, brings the good/service 24 to the customer 14. As part of this order placement and delivery process, a wearable computer peripheral device 26 is worn by at least the user 22 tasked with delivering the good/service to the customer 14 and is in communication with the database 18.

The method starts at S200 in response to the customer 14 placing an order at the order station 10. In the illustrated embodiment, the cashier 12 is wearing a computer peripheral device 28 mounted on regular spectacle frames. However, embodiments are contemplated where the computer device is or is not associated with a cash register. The cashier computer peripheral device 28 includes an image capture device, such as a camera, which captures a first image of the customer 14 during or after the order is placed. In one embodiment, the cashier computer peripheral device 28 can automatically capture the image in response to detecting a payment gesture being made by the customer 14. For example, a cash register (not shown) can be in communication with the cashier computer peripheral device 28 and can transmit a signal to the cashier computer peripheral device 28 when the payment is processed. In another example, the cashier computer peripheral device 28 can capture the image in response to detecting a manual gesture performed by the user that can be detected by the wearable device 28, such as an eye wink, head nod, or a hand gesture.

The cashier computer peripheral device 28 transmits (uploads) the captured image and order identification information to a database, which stores the image S202 at database 18, where it is made accessible to other employees. At least one image capture device 16 within a surveillance network tracks the customer 14 moving from the order station 10 to the table 20 using any known tracking operation at S204. The image capture device 16 can transmit the tracking information for storage in the database 18 or to a server computer, which processes the data to determine the customer's location. Alternatively, the data can be processed at the image capture device 16 and transmitted to the database 18 or directly to the wearable computer peripheral device 26 being worn by the user 22 tasked with delivering the good/service. FIG. 2 shows the delivery computer peripheral device 16 included on a pair of spectacle frames. Furthermore, a server computer 18 can process the image to determine additional customer information. When the good/service is ready for delivery, at least the customer image and customer location are transmitted to the delivery wearable computer peripheral device 26 of the user 22 tasked with delivering the good/service at S206. The delivery wearable computer peripheral device 26 displays the image and location information on a HUD ("Heads Up Display") for the user 22, who uses the updated location information to find the table or customer locality 20 and uses the image to identify the customer 14 at S208. In one embodiment, the user 22 can compare the customer 14 to the image and, in another embodiment, the user can provide the delivery wearable computer peripheral device 26 with some form of input signaling that the customer is identified. The delivery wearable computer peripheral device 26 also includes an image capture device that can record a second image of the customer 14 at the time of delivery to evidence that the transaction is complete. In an alternative scenario where the customer 14 picks up the good/service, the cashier computer peripheral device 28—being worn by the employee 12 located at the order station 10—can perform the delivery operations S206-S210.

Figure 3:
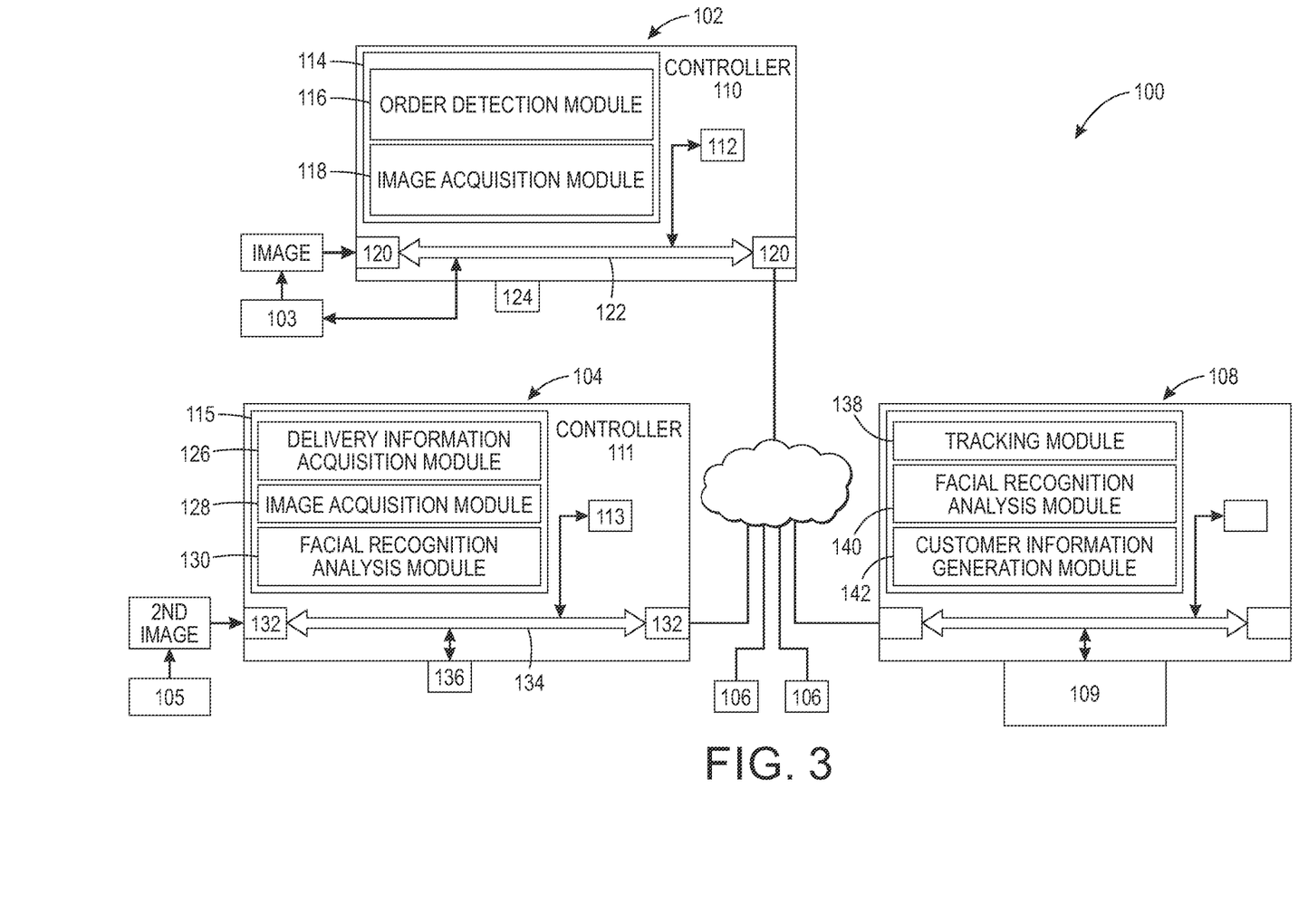
FIG. 3 is a schematic illustration of a Business-to-Consumer Transaction and Delivery Assistance System according to an exemplary embodiment of the disclosure.

FIG. 3 is a schematic illustration of a Business-to-Consumer Transaction and Delivery Assistance System ("system 100") according to one exemplary embodiment. The system 100 includes a first computer device 102, a wearable computer peripheral device 104 (i.e., a second computer device), and an image capture device 106, which may be linked together by communication links, referred to herein as a network. In one embodiment, the system 100 may be in further communication with a server computer 108. These components are described in greater detail below.

The computer device 102 illustrated in FIG. 3 includes a controller 110 that is part of or associated with the device. The exemplary controller 110 is adapted for implementing the operations disclosed herein. The controller 110 includes a processor 112, which controls the overall operation of the device 102 by execution of processing instructions that are stored in memory 114 connected to the processor 112.

The computer device 102 may include one or more special purpose or general purpose computing devices, such as a digital front end (DFE) or any other computing device capable of executing instructions for performing portions of the exemplary method. For example, the computer device 102 may be embodied in a networked device, such as a network computer, a handheld and/or mobile device, a cash register, a credit card or debit card machine, a kiosk, and a wearable peripheral computer device, etc., or the like, and is distributed throughout the network or otherwise accessible thereto. The phase for placing the order disclosed herein is performed by the processor 112 according to the instructions contained in the memory 114. In particular, the memory 114 stores an order detection module 116, which receives an order or notification that an order has been placed—either by receiving an input signal or detecting a payment gesture—and an image acquisition module 118, which acquires an image of a customer in response to the order being placed using a camera 103 in communication with the computer device 102.

The computer device 102 also includes one or more communication interfaces 120, such as network interfaces, for communicating with external devices, such as the image capture device 103 and the server computer 108. The communication interfaces 120 may include, for example, a modem, a router, a cable, wireless interfaces such as Bluetooth or WiFi, and and/or Ethernet port, etc. The communication interfaces 120 are adapted to receive image data as input and relay the image data and order information (such as a ticket/identification number) to a central storage database 109. The various components of the device 102 may be all connected by a bus 122.

The computer device 102 can include a graphic user interface (GUI) 124. The GUI 124 can include a display for displaying information to users, and a user input device, such as a keyboard or touch or writable screen, touch-sensitive frame, speech recognition device, for receiving instructions as input, and/or a cursor control device, such as a mouse, touchpad, trackball, or the like, for communicating user input information and command selections to the processor 112.

The wearable computer peripheral device 104 illustrated in FIG. 3 includes a controller 111 that is part of or associated with the device. The exemplary controller 111 is adapted for implementing the operations disclosed herein. The controller 111 includes a processor 113, which controls the overall operation of the device 104 by execution of processing instructions that are stored in memory 115 connected to the processor 113.

The phase for delivering the order disclosed herein is performed by the processor 113 according to the instructions contained in the memory 115. In particular, the memory 115 stores an delivery information acquisition/retrieval module 126, which receives customer identification and location information from other networked devices 102, 106, 108, 109; an image acquisition module 128, which acquires a second image of the customer in response to the order being delivered using a camera 105 in communication with the wearable computer peripheral device 104; and a facial recognition analysis module 130, which extracts a second set of facial feature recognition metrics from the second image and compares a first set of facial feature recognition metrics (received from the server computer 108) against the second set of facial feature recognition metrics.

The wearable computer peripheral device 104 also includes one or more communication interfaces 132, such as network interfaces, for communicating with external devices, such as the image capture device 105 and the server computer 108. The communication interfaces 132 may include, for example, a modem, a router, a cable, wireless interfaces such as Bluetooth or WiFi, and and/or Ethernet port, etc. The communication interfaces 132 are adapted to receive image data as input and relay the delivery confirmation information, such as a notification and/or second image data, to the central storage database 109. The various components of the wearable computer peripheral device 104 may be all connected by a bus 134.

The wearable computer peripheral device 104 can include a graphic user interface (GUI) 136. The GUI 136 can include a display for displaying the customer (e.g., first image) identification and location information to the user, and a user input device for communicating user input information and command selections to the processor 113.

The system illustrated in FIG. 3 also includes a central storage database 109, which stores the first image, the order identification (ticket) information, and the delivery confirmation (such as the second image). The computer device 102 and the wearable computer peripheral device 104 can upload and retrieve information directly to the database 109, or devices can communicate with a server computer 108 that receives and uploads and/or retrieves and transmits the stored information between the database and the devices.

The server computer 108 in certain embodiments also includes a controller, a processor, and memory (not shown) that operate similar to like components in devices 102 and 104. The server computer 108 also includes one or more communication interfaces connected by a bus, and can include a GUI, that function in similar manner to like components described above.

A phase for processing customer information is performed by the server computer processor according to the instructions contained in the memory. In particular, the memory stores a tracking module 138, which analyzes video data received from the image capture device 106 to detect the customer between video frames and determines a location of the customer within the monitored region; and a facial recognition analysis module 140, which extracts facial recognition metrics from the first image; and, a customer information generation module 142, which processes the first image data to generate at least one of a description and features of the customer's appearance.

Embodiments are contemplated wherein the instructions can be stored in a single module or as multiple modules embodied in the different devices. For example, the facial recognition analysis module 140 and customer information generation module 142 can be embodied in the computer device 102 or the tracking module 138 can be embodied in the image capture device 106 in embodiments excluding a server computer. The modules 116-118, 126-130, and 138-142 will be later described with reference to the exemplary method.

The software modules as used herein, are intended to encompass any collection or set of instructions executable by the system 100 so as to configure the respective computer devices 102, 104, 108 to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions.

The memories 114, 115 may represent any type of tangible computer readable medium such as random access memory (RAM), read only memory (ROM), magnetic disk or tape, optical disk, flash memory, or holographic memory. In one embodiment, the memories 114, 115 comprise a combination of random access memory and read only memory. The digital processors 112, 113 can be variously embodied, such as by a single-core processor, a dual-core processor (or more generally by a multiple-core processor), a digital processor and cooperating math coprocessor, a digital controller, or the like. The digital processors, in addition to controlling the operation of the computer device 102, wearable computer peripheral device 104 and server computer 108 execute instructions stored in memories 114, 115 for performing the parts of the method outlined in FIGS. 2 and 4. In some embodiments, a processor 112, 113 and memory 114, 115 may be combined in a single chip.

FIG. 3 further illustrates the system 100 including at least one image source 106 for inputting and/or receiving the video data and/or image data (hereinafter collectively referred to as "video data") in electronic format. The image source 106 may include an image capture device, such as a camera. The image source 106 can include one or more surveillance cameras that capture video data from a region of interest. In one embodiment, the image source 106 can be a device adapted to relay and/or transmit the video captured by the camera to the server computer 108, wearable computer peripheral device 106 and/or central storage database 109. The image source 106 can include a camera sensitive to visible light or having specific spectral sensitivities, a network of such cameras, a line-scan camera, a computer, a hard drive, or other image sensing and storage devices. In another embodiment, the video data may be input from any suitable source, such as a workstation, a database, a memory storage device, such as a disk, or the like. The image source 106 is in communication with the other network devices discussed above.

Figure 4:
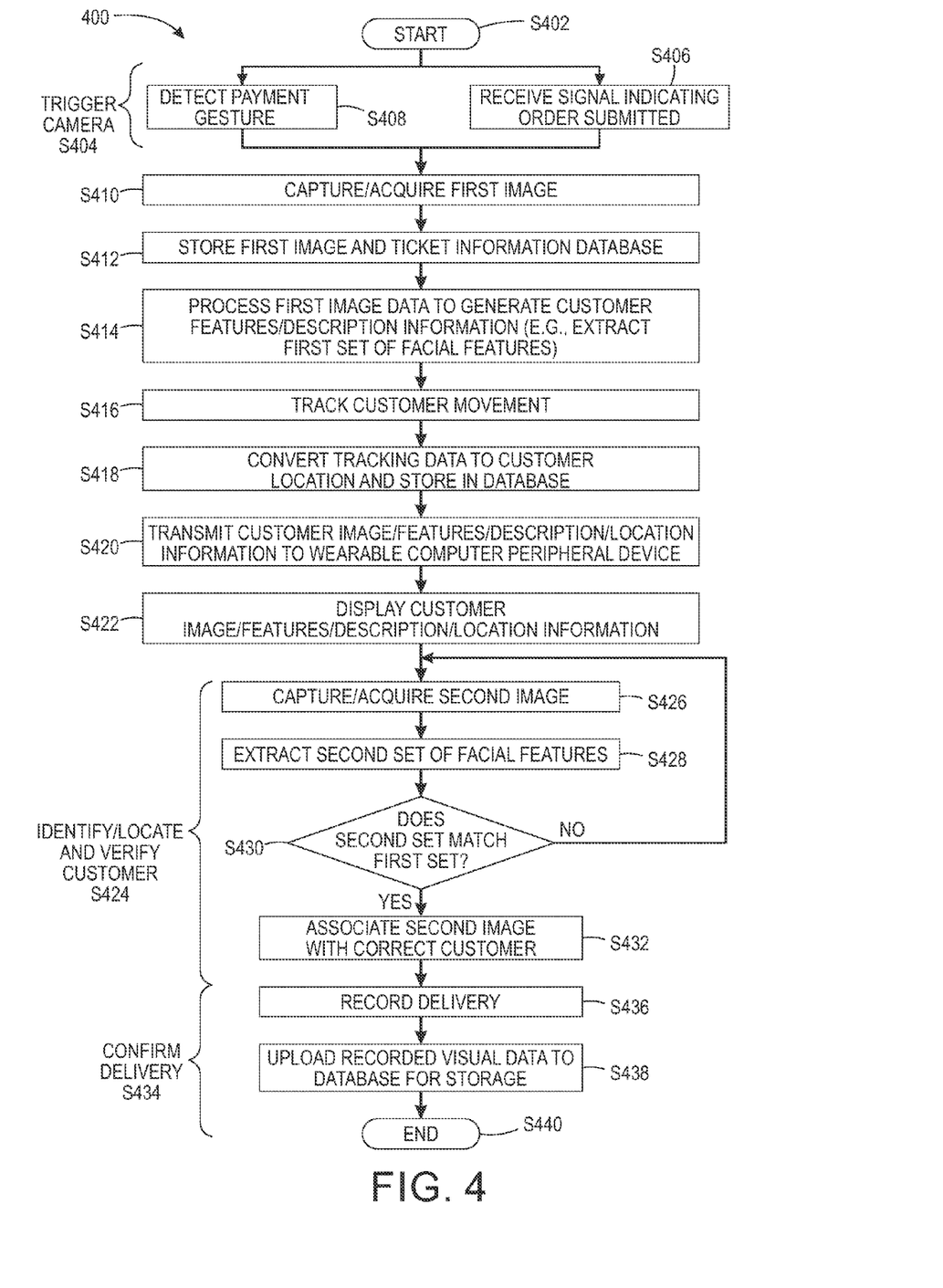
FIG. 4 is a flowchart illustrating a detailed method for completing a transaction and delivery of a good/service between a business and customer according to an exemplary embodiment of the disclosure.

FIG. 4 is a flowchart illustrating a detailed method 400 for completing a transaction and delivery of a good/service between a business and customer according to an exemplary embodiment of the disclosure. The method starts at S402. As the present disclosure anticipates use in a transactions and/or exchanges made between two parties, such as a business and customer, the method 400 triggers an image capture device at S404 when a transaction is initiated. Generally, the method anticipates that a customer (or person) places an order for a good/service. The customer can approach an order station, which can include a service counter or (e.g., drive-through) window that is staffed by an employee (or different person), an employee not stationed at a dedicated location but carrying a hand-held computer device for taking orders, a kiosk that automatically receives orders via customer selections and/or input, or any other contemplated person or device that receives customer orders. In the contemplated embodiment, a computer device located at the order station is configured to trigger the image capture device when the order for the good/service is being placed or is placed. The computer device can be any networked device, such as a network computer, a handheld and/or mobile device, a cash register, a credit card or debit card machine, and a kiosk, etc. configured to receive the order through various input selections and instructions, or it can be a wearable peripheral computer device or the like in communication with a different device configured to receive the order.

In one embodiment, the computer device can trigger the image capture device in response to receiving a signal at S406 indicating that the transaction is initiated. The order detection module 116 receives the signal. For example, the signal may simply be an input selection made at a GUI of the computer device, such as a keystroke entered by the employee taking the order, touching the wearable device, or it may be transmitted from a different device in communication with the computer device. For example, an employee-staffed register may include an icon for finalizing/verifying the order or payment, and selection of the icon by the customer can be converted to a signal. However, the disclosure relates to the transfer of items (goods/services) from one party (e.g., the business) to another (e.g., the customer), and is not limited to transfers which require payment in exchange. In other words, embodiments are contemplated in which a signal is triggered in some manner, regardless of whether the transaction does or does not involve a payment in exchange.

Figure 5:
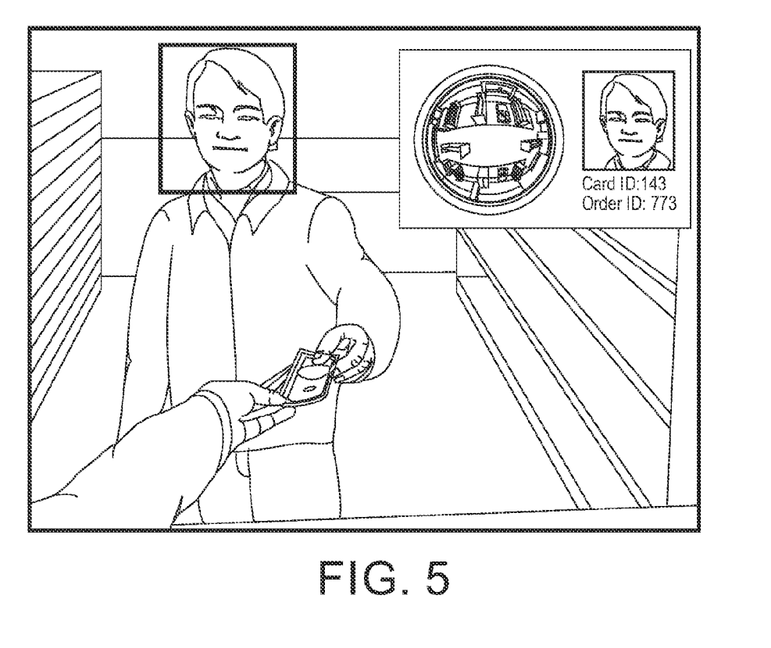
FIG. 5 is an example gesture detected by a computer device for triggering an image capture device to capture an image of the customer.

In another embodiment, the computer device can detect a payment gesture at S408. Different forms of gesture recognition are disclosed in co-pending and commonly assigned U.S. patent application Ser. No. 13/964,652 (now Published application No. US-2014-0064566-A1), entitled "Heuristic-Based Approach for Automatic Payment Gesture Recognition", filed Aug. 12, 2013, by Matthew Shreve, et al., which is totally incorporated herein by reference. In one example, the gesture can be detected as the customer handing payment to the employee (or kiosk). FIG. 5 shows an example (handing-of-payment) gesture detected by a computer device for triggering an image capture device to capture an image of the customer. In another embodiment, the gesture can include a facial expression made by the customer, such as a wink which is prompted by the employee or kiosk.

After being triggered, the computer device 102 automatically acquires a first image of the customer at S410. In one embodiment, the computer device 102 is a wearable computer peripheral device, similar to the device shown in FIG. 1, which is worn by the employee at the order station. While the example device is shown included on a pair of spectacle frames, there is no limitation made herein to the article which the device belongs. For example, the wearable computer peripheral device can extend from the visor/cap, etc. The wearable computer peripheral device includes a camera 103 focused on the customer which the employee wearing the device 102 is looking at. In another embodiment where the computer device 102 includes a register or kiosk, the camera can be connected to, included on, or in communication with the device and the first image can be captured by the camera. In yet another embodiment, the camera can be included on the wearable computer peripheral device, but the order can be placed on a register in communication with the wearable computer peripheral device such that the camera captures the first image when a signal is transmitted from the register.

Returning to FIG. 4, the computer device 102 uploads the first image to a server computer 108 which contains a central database 109 that stores the image at S412. The first image is made accessible to other employees. The server computer 108 can store additional information in the database, such as current order/ticket information that it received from the computer device 102. Furthermore, the server computer 108 can process the first image data to generate further customer information at S414. The facial recognition analysis module 140 can extract a first set of facial recognition metrics/features from the first image, and/or the customer information generation module 142 can generate a description of the customer's appearance, which are also stored in the database 109. Alternatively, the computer device 102 can process the first image and transmit the output to the server computer 108 for storing the features and description in the database 109.

Figure 6:
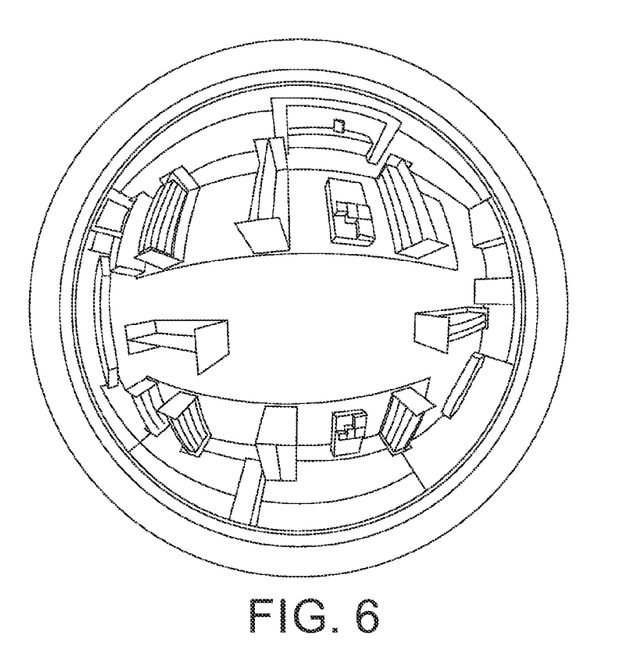
FIG. 6 shows example output from a tracking algorithm used to detect a location of the customer in the region of interest.

Simultaneously, the system 100 tracks the customer's movement within the region at S416. This region can include an area including and between the order station and a waiting section removed from the order station, an area surrounding the both (for example, where the order station is located in an interconnecting walkway of a shopping mall, a stadium, etc.), all or portion of the structure (such as, a store or restaurant) containing the both, or a monitored scene of interest (such as a square or roadway hosting an outdoor market), etc. To achieve the tracking, a surveillance network including at least one image source 106 (or similar performing sensor) monitors the region of interest. FIG. 6 shows example output from the tracking algorithm. Any known tracking algorithm can be used to track the customer or an object associated with the customer. Generally, a sequence of frames and/or images is each analyzed to detect and/or identify the customer, and then the movement is tracked as a change in the customer's location between frames. This analysis involves extracting objects in a frame and generating features (e.g., corners, texture, and color, etc.) of each object. The features are tracked over time. This analysis can be performed by a processor at the image source 106. Alternatively, the present disclosure can be integrated with other surveillance and tracking methods. For example, the image source 106 can provide the captured visual/tracking data to the tracking module 138 stored at the server computer 108, which can process the sequence of frames/images.

The processed visual/tracking data is also used to determine a location of the customer at S418 within the region of interest. The final location, or updated locations, can be stored at the database 109 while the order is being processed by the business. Embodiments are contemplated, however, where this information can be transmitted directly to the wearable computer peripheral device 104 in real time and bypass the database 109.

When the good/service is ready for delivery, a user can be tasked with either delivering the good/service to the customer or confirming that the customer picks up or receives the good/service. In the contemplated embodiment, this user is wearing the wearable computer peripheral device 104. To assist in this task, the wearable computer peripheral device 104 retrieves the customer image/information and customer location from the database 109 at S420. In one embodiment, the information can be retrieved in response to user-instruction. For example, the wearable computer peripheral device 104 can include selections that trigger the retrieval when it is depressed by the user. There is no limitation made herein to the options available, but one embodiment contemplates that the user provides the server computer 108 with the ticket and/or order number associated with the transaction and customer.

The wearable computer peripheral device 104 includes a GUI/monitor and displays at least one of the retrieved customer image/description/feature/location information for the user at S422. In the embodiment where the wearable computer peripheral device 104 is included on a pair of spectacle frames, the information can be displayed on the HUD.

Figure 7:
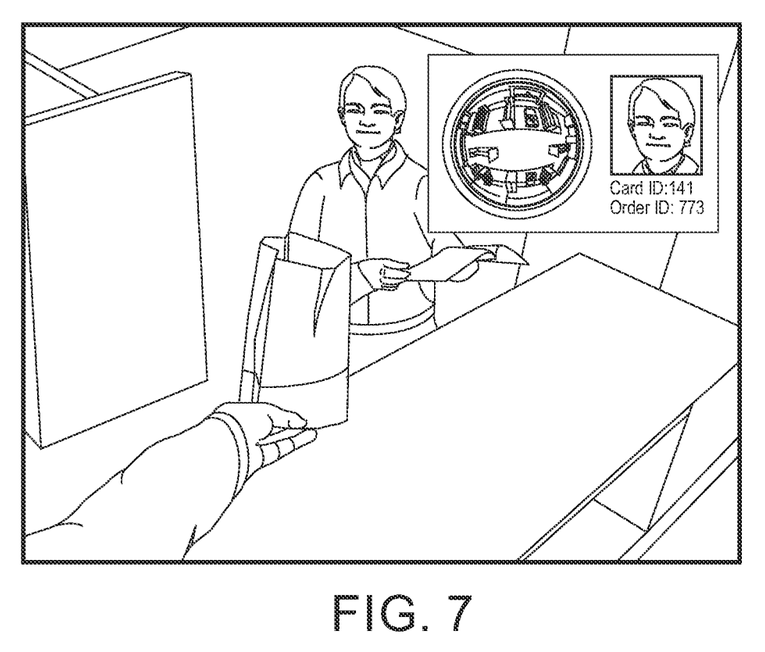
FIG. 7 is an example display of the wearable computer peripheral device during the delivery of a good/service to the customer.

The purpose of the displaying of the information is to enable the user to quickly complete the transaction by reducing the time it may otherwise take a user to find and identify the customer. FIG. 7 is an example display of the wearable computer peripheral device during the delivery/pick-up of a good/service to the customer. Accordingly, the first image (or description, features, etc.) can assist the user in identifying the customer and the location can assist the user in finding the customer. In an alternate embodiment where the customer approaches a pick-up station, the first image (or description, features, etc.) can assist the user in identifying the customer.

In one embodiment, the user can make a visual comparison between the displayed first image and the customer before relinquishing the good/service to the customer. However, other embodiments are contemplated where the system 100 performs an automatic customer identification and verification process at S424.

In one embodiment, the image acquisition module 128 can acquire images of customers and performs computer vision or a facial recognition process on the images to determine the customer matching the retrieved customer information/data. More specifically, the wearable computer peripheral device 104 includes a camera 105 that captures images of the customer(s) (the "second image") within the user's field of view at S426. The facial recognition analysis module 130 extracts a second set of facial feature recognition metrics from the second image at S428. The module 130 compares the first set of facial features (received from the server computer 108) against the second set of facial features at S430. In response to identifying a match (YES at S430), the system associates verifies the correct customer is located at S432. In response to not identifying a match (NO at S430), the system repeats S424 until the correct customer is identified, In response to the system 100 verifying the correct customer identity, the wearable computer peripheral device 104 can confirm the delivery and/or pick-up of the good/service at S434 to evidence that the order is filled. In one embodiment, the image capture device 105 of the wearable computer peripheral device 104 can record the exchange of the good/service between the user and the customer to evidence the delivery at S436. In other words, the image capture device 105 can capture an image of the exchange or record video of the customer receiving the goods (see FIG. 7). The wearable computer peripheral device 104 can transmit the recorded visual data to the database 109 at S438, where the data is stored, to complete the transaction. The method ends at S440.

Although the control method 200, 400 is illustrated and described above in the form of a series of acts or events, it will be appreciated that the various methods or processes of the present disclosure are not limited by the illustrated ordering of such acts or events. For example, the delivery phase starting at S420 can be used by carriers or delivery drivers delivering items and packages to a number of homes and businesses, etc. located apart from one another. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for delivering one of a good and service to a customer in a retail environment, the system comprising:
 a computer located at an order station and being configured to receive an order for the one good and service;
 a first image capture device in communication with the computer and being configured to capture a first image of a customer ordering the one good and service in response to the order being submitted; and,
 a wearable computer peripheral device configured to acquire the first image from the first image capture device and electronically display the first image to a user tasked with delivering the one good and service while carrying the second wearable computer peripheral device such that an identify of the customer can be compared against the first image upon a delivery of the one good and service.

2. The system of claim 1 wherein the wearable computer peripheral device includes a second image capture device, the wearable computer peripheral device being configured to:
 receive a first set of facial features generated from the first image;
 capture a second image of the customer upon the delivery of the one good and service;
 extract a second set of facial features from the second image; and,
 compare the first set against the second set of features using a face recognition module in order to verify the delivery of the one good and service to a correct customer.

3. The system of claim 2, wherein the wearable computer peripheral device is further configured to:
 confirm the delivery of the one good and service by capturing the second image of the customer in response to an identity of the customer being verified.

4. The system of claim 1, wherein the computer is configured to generate at least one of a description and features of the customer's appearance, an order identification, a real-time location of the customer in the retail environment, and a combination of the above and provide the at least one features, description, identification, and location to one of a central store database and the wearable computer peripheral device.

5. The system of claim 1, wherein the computer is further configured to:
 detect a payment gesture made by the customer; and,
 in response to detecting the payment gesture, capture the at least one image of the customer using the first image capture device.

6. The system of claim 1 further comprising a central store database in communication with the computer and the wearable computer peripheral device, wherein the computer is configured to transmit the first image to the central store database and the central store database is configured to relay the first image to at least the wearable computer peripheral device.

7. The system of claim 1 wherein the image capture device is located at the order station.

8. The system of claim 1 further comprising at least one of a sensor and image capture device in communication with the wearable computer peripheral device, the one sensor and image capture device being configured to automatically track movement of the customer through the retail environment and transmit a location of the customer to the wearable computer peripheral device.

9. The system of claim 1, wherein the wearable computer peripheral device is further configured to display directions to the employee of a location of the customer for delivering the one of the good and service to the customer.

10. The system of claim 1, wherein at least the wearable computer peripheral device includes a display provided on a head mounted computer.

11. The system of claim 1, wherein the order station includes at least one of an employee manned counter, window, and food cart and an electronic kiosk.

12. A method for delivering one of a good and service to a customer in a retail environment, the method comprising:
 receiving an order for the one good and service at a computer located at an order station;
 in response to the order for the one good and service being submitted, capturing a first image of a customer submitting the order using a first image capture device in communication with the computer;
 using a wearable computer peripheral device, electronically providing an employee of the retail environment the first image of the customer for comparing an identify of the customer against the first image upon a delivery of the one good and service.

13. The method of claim 12, further comprising, using a second image capture device on the wearable computer peripheral device, confirming the delivery of the one good and service by capturing a second image of the customer in response to an identity of the customer being verified.

14. The method of claim 12, further comprising:
 receiving at the wearable computer peripheral device a first set of facial features generated from the first image;
 using a second image capture device included on the wearable computer peripheral device, capturing a second image of the customer upon the delivery of the one good and service;
 extracting a second set of facial features from the second image using the wearable computer peripheral device; and,
 comparing the first set against the second set using a face recognition module to verify the delivery of the one good and service to a correct customer.

15. The method of claim 14, further comprising:
 confirming the delivery of the one good and service by capturing the second image of the customer in response to an identity of the customer being verified.

16. The method of claim 12 further comprising generating at least one of a description of the customer's appearance, an order identification, a real-time location of the customer in the retail environment, and a combination of the above; and, providing the at least one description, identification, and location to one of a central store database and the wearable computer peripheral device.

17. The method of claim 12, further comprising:
detecting a payment gesture made by the customer; and,
in response to detecting the payment gesture, capturing the at least one image of the customer using the first image capture device.

18. The method of claim 12 further comprising:
transmitting the first image to a central store database in communication with the computer and the wearable computer peripheral device; and,
transmitting the first image from the central store database to at least the wearable computer peripheral device.

19. The method of claim 12, wherein the image capture device is located at the order station.

20. The method of claim 12 further comprising:
automatically tracking movement of the customer through the retail environment using at least one of a sensor and image capture device in communication with the wearable computer peripheral device; and,
transmitting a location of the customer to the wearable computer peripheral device.

21. The method of claim 12 further comprising:
displaying directions at the wearable computer peripheral device to a location of the customer for delivering the one of the good and service to the customer.

22. The method of claim 12, providing a display device on the wearable computer peripheral device.

23. The method of claim 12, wherein the order station includes at least one of an employee manned counter, window, and food cart and an electronic kiosk.

* * * * *